Aug. 3, 1937.  H. GEORGE ET AL  2,089,022
HEATING MEANS
Filed Jan. 27, 1934  6 Sheets-Sheet 1

INVENTORS
HENRI GEORGE
GASTON DELPECH
BY
ATTORNEYS

Aug. 3, 1937.  H. GEORGE ET AL  2,089,022
HEATING MEANS
Filed Jan. 27, 1934  6 Sheets-Sheet 2

INVENTORS
HENRI GEORGE
GASTON DELPECH
BY
ATTORNEYS

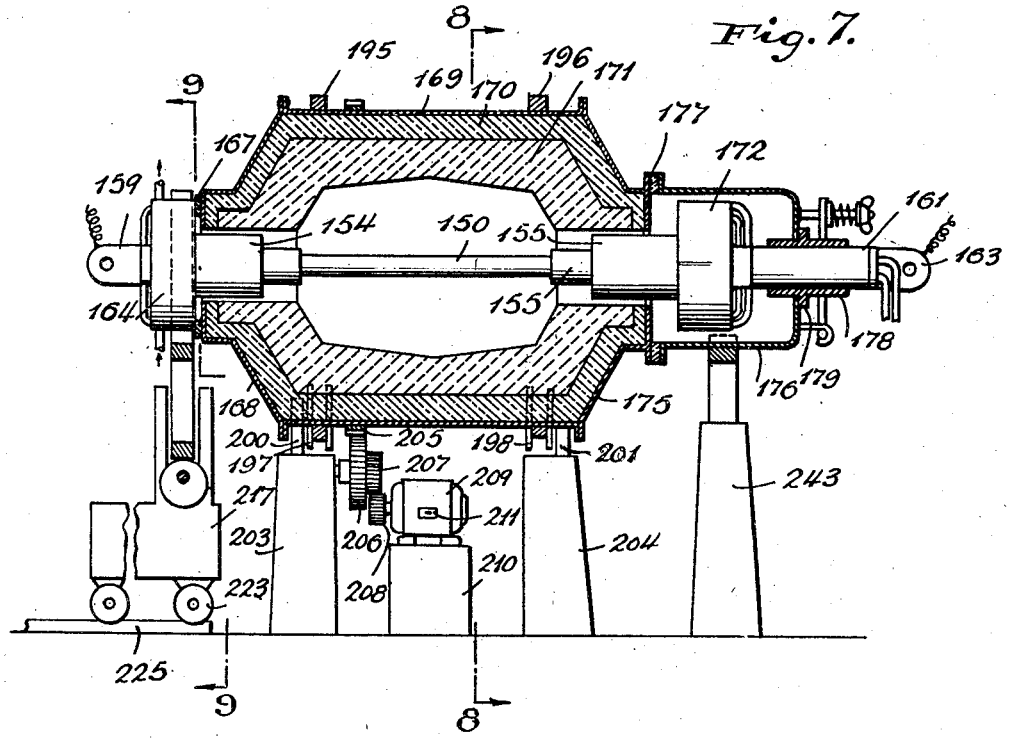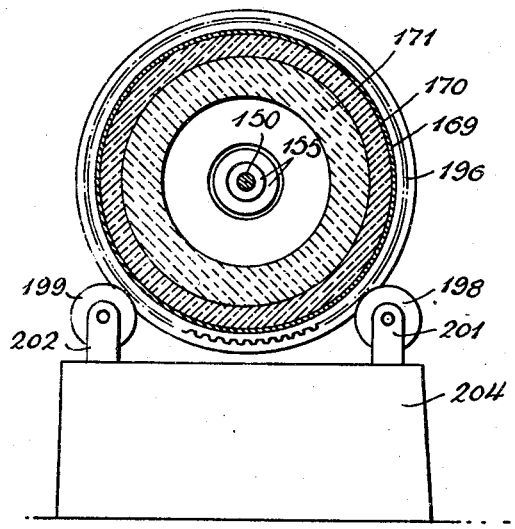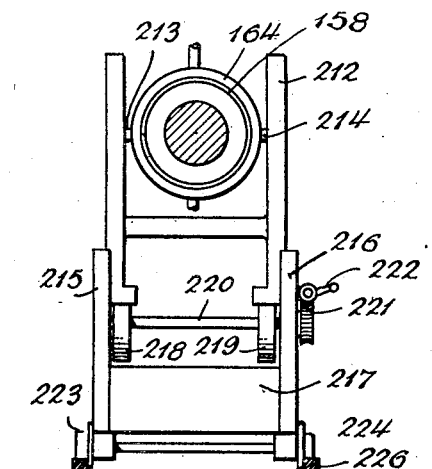

Aug. 3, 1937.  H. GEORGE ET AL  2,089,022
HEATING MEANS
Filed Jan. 27, 1934  6 Sheets-Sheet 4

INVENTORS
HENRI GEORGE
GASTON DELPECH
BY
ATTORNEYS

Aug. 3, 1937.   H. GEORGE ET AL   2,089,022
HEATING MEANS
Filed Jan. 27, 1934   6 Sheets-Sheet 5

INVENTORS
HENRI GEORGE
GASTON DELPECH
BY
ATTORNEYS

Aug. 3, 1937.　　　H. GEORGE ET AL　　　2,089,022
HEATING MEANS
Filed Jan. 27, 1934　　6 Sheets-Sheet 6
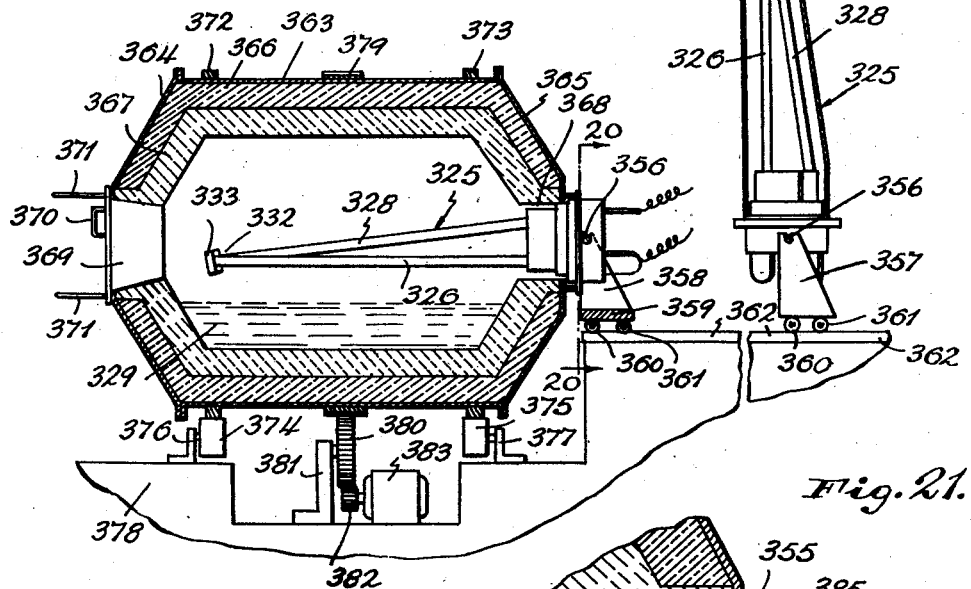
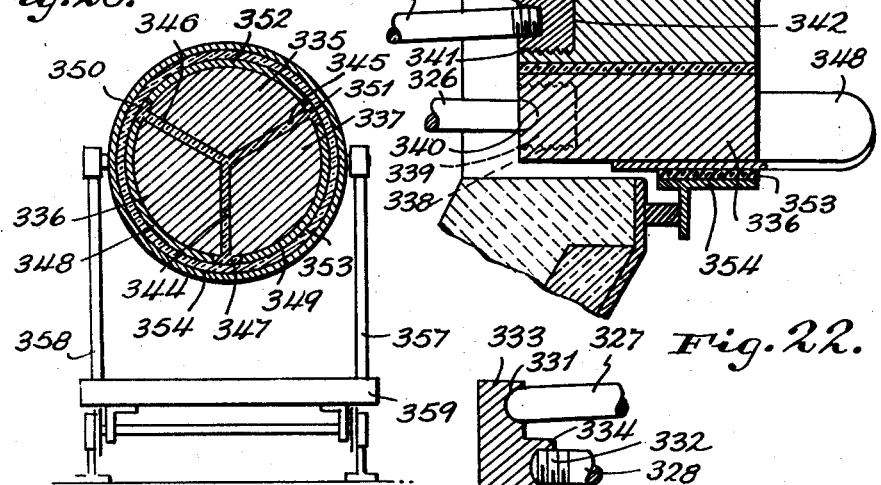
INVENTORS
HENRI GEORGE
GASTON DELPECH
BY
ATTORNEYS Patented Aug. 3, 1937

2,089,022

UNITED STATES PATENT OFFICE 2,089,022

HEATING MEANS

Henri George, Paris, and Gaston Delpech, Clamart, France, assignors to Societe Anonyme des Manufactures des Glaces & Produits Chimiques de Saint-Gobain, Chauny & Cirey, Paris, France Application January 27, 1934, Serial No. 708,618 In France January 30, 1933

9 Claims. (Cl. 13—21)

This invention refers to heating means and relates more particularly to electrical furnaces for heating, fusing and/or casting articles made of substances having a high melting point, said furnaces being preferably used for the melting of refractory material, such as quartz.

In our copending patent application relating to "Electrical heating", Serial Number 648,996 filed December 27th, 1932, an electrical furnace is described, which comprises a heating element consisting of a carbon rod and surrounded by a container which is situated within the zone of heat radiated by the heating element and which is movable with respect to this element. A gaseous medium may be introduced into the furnace and allowed to flow between the heating element and the walls of the container.

An object of the present invention is to provide certain improvements in furnaces of this type to increase their output and their efficiency.

A considerable amount of heat is lost in rotatable electrical furnaces known in prior art, particularly at the two ends of the cylindrical container. Practical experience has shown that in some instances the electrical contact between a terminal connected with a source of electrical energy and the heating element is liable to be interrupted in the course of operation of the furnace.

It was found that the gas introduced into a rotatable electrical furnace was not utilized to the greatest possible extent because of certain constructional defects of such furnaces and also because no means were provided for reversing the direction of flow of the gas passing through the furnace.

Other drawbacks of electrical furnaces used in prior art consist in that it was necessary to use entirely new supporting means when a container having a different diameter was to be employed and also in that a heating element situated in the middle of a container sometimes failed to radiate an amount of heat which was sufficient for the manufacture of hollow articles having a large diameter and walls of a variable thickness.

It was also found that furnaces, the fusing zones of which must be devoid of contact with the surrounding atmosphere do not operate efficiently in a number of instances due to the lack of proper connecting means between the electrical terminals and the rotatable parts of the furnaces.

The use of a single heating rod in a rotatable furnace is often impractical, particularly when a poly-phase electrical current is available for heating purposes.

Another object of the present invention is to compensate for the higher losses in heat at the end sections of a furnace by increasing the amount of heat generated by a heating element in these sections of the furnace.

A further object is the provision of a furnace having resilient means which are adapted to maintain a steady contact between the terminals and the heating element in spite of the movements of the various parts of a furnace in the course of the heating or fusing process.

Still another object is the provision of a furnace having means for regulating the flow of a gas therein, said furnace being also provided with a device adapted to reverse the flow of the gas within the furnace.

Still further object is the provision of means for supporting containers having various dimensions in such a way, that the axis of rotation of these containers is always maintained at the same level from the floor of the workshop irrespective of the size of the containers.

Another object of the invention is the provision of a furnace adapted to manufacture hollow bodies having large diameters and walls of a varying thickness.

Still another object is to provide for a better connection between the terminals and the rotary containers of furnaces the zone of fusion of which must be devoid of communication with the surrounding atmosphere.

A further object is the provision of a heating element which can be heated by a three-phase electrical current.

The above and other objects of the present invention may be realized through the provision of an electrical furnace or furnaces which comprise a heating rod, the end portions of which have a cross-section which is smaller than that of the middle of the rod. A spring or other resilient member is used for interconnecting mechanically but not electrically one of the electrical current terminals with the main body of the rotatable furnace; the ends of the rotatable container and the supports carrying the ends of the heating rod carry discs or plates preferably made of graphite or amorphous carbon and used to direct the flow of a gas through the furnace. Fans or other suitable ventilating devices are used for reversing the direction of flow of the gas at suitable intervals. The rotatable container is carried by rollers mounted on adjustable supports, so that when a container having a certain diameter is replaced by a container having a larger or a smaller diameter, the position of the rollers may be adjusted in such a way, that the central axis of the new container occupies the same position as the central axis of the previously used container. Heating rods of large furnaces are placed at a certain distance from and parallel to the central axis of rotation of the container, and are carried by means adapted to revolve the heating rods with a variable velocity within the containers. In furnaces which must have a hermetically closed fusing zone, suitable sealing means are provided between the terminals and the container, which is rotatable in two different directions. To enable the use of a three-phase current for the heating of the electrical heating element, this element is made of three separate rods which are electrically joined in a star-connection and are carried by a movable support. A refractory granulated material, such as quartz, is placed in the interior of the rotary furnace and is pressed against the inner side walls of the furnace by centrifugal forces developed in the course of the rotation thereof.

The invention will appear more clearly from the following detailed description when taken in connection with the accompanying drawings showing preferred embodiments of the inventive idea.

In the drawings:

Figure 5 is a section along the line 5—5 of Figure 1.

Figure 6 is a section along the line 6—6 of Figure 1.

Figure 7 shows a furnace having a hermetically closed fusing zone in axial-section and partly in side elevation.

Figure 8 is a section along the line 8—8 of Figure 7.

Figure 9 is a section along the line 9—9 of Figure 7.

Figure 18 shows a furnace of a somewhat different type in vertical section, some parts being shown in side-elevation.

Figure 19 shows the heating element used in connection with the furnace illustrated in Figure 18.

Figure 20 is a section along the line 20—20 of Figure 18.

Figure 21 shows on a larger scale and in vertical section a part of the device illustrated in Figure 18.

Figure 22 is a section through a part of the heating element, shown in Figure 19, on a larger scale.

Figure 1:
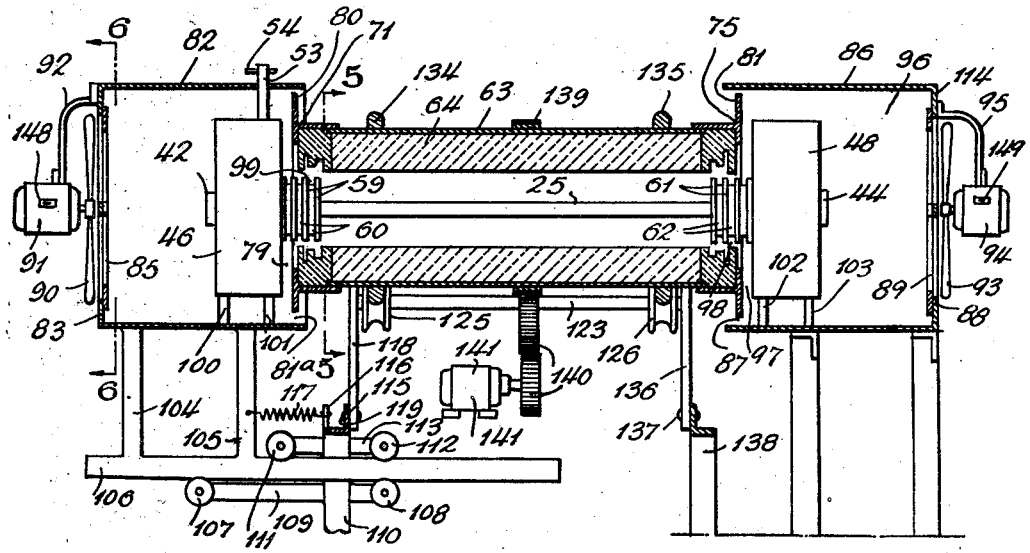
Figure 1 shows an electrical furnace in side elevation, and partly in axial-section.

The furnace illustrated in Figures 1 to 6 of the drawings comprises a heating rod or resistance 25 which is made of carbon and has the shape of a cylinder. The heating element 25 is provided with a hole 26 bored along its central axis and with longitudinal grooves 27 which are shown more clearly in Figures 2 and 4.

The heating element 25 has two conical ends 28 and 29 (Fig. 2); a larger amount of heat is radiated by these conical ends than by the main cylindrical portion of the heating element. The end 28 is situated within a corresponding cavity formed in a support or cylinder 30 which is made of graphite and which is provided with exterior screw threads 31. An abutment 32 is formed on the exterior surface of the cylinder 30 and is used for adjusting the position of the resistance 25 according to its length.

The opposite end 29 of the resistance 25 is situated in a cavity formed in a similar cylinder 33 which is made of graphite and is provided with exterior screw threads 34. The cylinder 33 is also provided with an abutment 35 which serves for the same purpose as the abutment 32, namely, for adjusting the position of the heating element within the furnace.

A conical sleeve 36 is provided with interior screw threads which correspond to the screw threads 31 so that the cylinder 30 may be screwed into the interior of the sleeve 36. A similar sleeve 37 is arranged at the opposite end of the furnace and surrounds the cylinder 33 which is screwed into the sleeve 37 by means of screw threads 34. The sleeves 36 and 37 are both made of graphite.

Two large plates 38 and 39, which are made of amorphous carbon, are situated on opposite sides of the furnace. Both plates are poor conductors of heat so that the heat radiated by the resistance 25 cannot easily escape into the exterior. The plate 38 is provided with an opening 40 a part of which is conical in shape so that the sleeve 36 can be fitted into the plate 38. The plate 39 is provided with a similar opening 41 and carries the sleeve 37.

A stopper 42 provided with screw threads 43 may be screwed into the plate 38 to close the opening 40. A similar stopper 44 is situated at the opposite end of the furnace and is provided with screw threads 45. The stopper 44 is screwed into the plate 39 and is used for closing the opening 41 formed in the plate 39.

The plate 38 is surrounded by a metallic casing 46 which is connected at 47 with a source of electrical energy not shown in the drawings. The plate 39 is surrounded and carried by a similar metallic casing 48 which is connected at 49 to the same source of electrical energy.

A radial opening 50 is formed in the metallic casing 46 and the plate 38. The opening 50 joins the central opening 40 and is used for the insertion of means for adjusting the heating element 25 into the furnace, or to remove it out of the furnace.

A carbon rod 51 is situated within the opening 50 and is provided with a lower conical end 23 which may come in contact with the resistance 25 and which may be used to adjust the position of this resistance. The carbon rod 51 is connected by a narrower portion 52 with an upper portion 53, a part of which is provided with screw threads meshing with corresponding screw threads formed in the metal casing 46.

A handle 54 is used for moving the rod 51 up and down within the opening 50 when it is necessary to adjust the resistance 25 into the furnace or to remove it out of the furnace. The handle 54 and the adjacent part of the member 53 are, when necessary, electrically insulated from the metal casing 46 by any suitable means not shown in the drawings.

A disc 55 made of graphite is situated at a certain distance from the plate 38 and is used as a connection between the metallic casing 46 and the sleeve 56 which surrounds a portion of the resistance 25 without coming in contact with the resistance.

A similar graphite disc 57 is placed at the opposite side of the furnace and supports a sleeve 58 around another portion of the resistance 25.

The sleeve 56 carries a number of rings 59 and 60 made of graphite and having different diameters. Similar rings 61 and 62 are carried by the sleeve 58.

The resistance 25 is surrounded by a rotary casing 63 containing the material 64 which is to be fused in the furnace.

An annular plate 65 which is made of a heat resisting material is used for closing one end of the casing 63. A similar plate 66 made preferably of the same material is situated at the opposite end of the furnace.

A pair of rings 67 and 68 consisting of graphite are carried by the plate 65. Similar rings 69 and 70 are carried by the plate 66.

A metallic annular flange 71 is carried by the casing 63 and is connected through the medium of an annular member 72 with a screen or ring 73.

Another annular plate 74 which is made of heat resisting material is situated between the plate 65 and the screen 73.

A similar device is provided at the opposite end of the furnace. An annular flange 75 is carried by the casing 63 and supports through the medium of a member 76 a screen 77, which in its turn serves as a support for the plate 78 made of a heat resisting material.

The disc 55 is situated at a certain distance from the flange 71 so that a space 79 is formed between these two members.

The flanges 71 and 75 are provided with annular projecting portions 80 and 81, respectively, the portion 80 of the flange 71 closing partly the opening 81a of a hollow casing 82 shown in Figure 1, while the portion 81 of the flange 75 closes partly the opening 87.

As shown in Figures 1 and 6 of the drawings, the casing 82 is provided with walls 83 having openings 84, which may be closed by means of shutters 85.

At the opposite end of the furnace there is a casing 86 having an opening 87 which is partly closed by the portion 81 of the flange 75. The opposite walls 114 of the casing 86 are provided with openings 88 which may be closed by means of shutters 89.

A fan 90 is driven by a motor 91 carried by an arm 92 which is connected with the wall 83 of the casing 82.

A similar fan 93 is situated at the opposite end of the furnace and is driven by a motor 94 which is carried by an arm 95 attached to the wall 114 of the casing 86. The motors 91 and 94 are provided with suitable switches 148 and 149, respectively.

When the fan 93 is being operated, the shutters 85 at the opposite end of the furnace may be placed in such a way that they partly close the openings 84 with the result that the fan 90 is not affected by the current of air and gases produced by the fan 93.

The fan 93 produces a current of air within the chamber 96 surrounded by the casing 86. This current of air passes through the opening 87 and through the space 97 formed between the disc 57 (Fig. 2) and the flange 75. Hot gases flow through the space 98 formed between the rings 61 and 62 on one side and the members 77, 78, 70, and 69 on the other side (Fig. 2) and penetrate into the interior of the casing 63.

The heated gases leaving the interior of the casing 63 pass through the space 99 formed between the rings 59 and 60 on the one hand, and the members 67, 68, 74, and 73 on the other hand. These gases leave the furnace through the space 79.

As shown in Figure 1, the metal casing 46 is carried by two insulating supports 100 and 101, which are carried by the casing 82.

The metal casing 48 is carried by the supports 102 and 103, which are supported by the casing 86.

The casing 82 is carried by supports 104 and 105, which are rigidly connected with and carried by a carriage 106. Two guide rollers 107 and 108 are connected with each other by an arm 109, which is carried by a support 110. Two rollers 111 and 112 are situated on the opposite side of the carriage 106 and are rotatably mounted in an arm 113. The arm 113 is rigidly connected with the support 110, which also carries an L-shaped iron 115 and a finger 116.

Due to this arrangement, the carriage 106 is movable in the direction of the longitudinal axis of the furnace along the four rollers 107, 108, 111, and 112. Since the casings 46 and 82 are rigidly connected with the carriage 106 by the supports 100, 101, 104, and 105, these casings along with the parts carried by these casings may be moved in a direction towards and away from the casing 63, when it is necessary to insert the material 64 into the interior of the furnace, or to remove it from this furnace, or when it is necessary to replace the resistance 25 by a new one.

When the melting process has been completed, the carriage 106 is freed by separating the spring 117 from the fixed finger 116. Then the carriage 106 is moved away from the furnace along with all the parts carried by the carriage, thereby withdrawing the resistance 25 from the interior of the furnace. After the solidification of the molten article, the flange 71 carried by the casing 63 is taken off, and then the rings 67 and 68, the plates 65 and 74, the screen 73 and the member 72 are removed. Then the cast article can be easily removed, due to the provision of a layer of comminuted substance which has not been molten between the cast article and the casing 63.

The support 110 is connected with the main foundation, which is not shown in the drawings. The finger 116 carries one end of a spring 117, the opposite end of which is attached to the support 105. The spring 117 tends to maintain the carriage 106 in the position shown in Figure 1.

Since the end 28 of the resistance 25 is carried by a cylinder 32, which is movable along with the casing 46 and the carriage 106, the spring 117, which tends to maintain the casing 46 and other members connected with this casing at a certain distance from the casing 63, prevents the end 28 of the resistance 25 from falling out of the cylinder 32; otherwise the end 28 and the cylinder 32 could easily become disconnected due to the fact that the carriage 106 is movable along the rollers 107, 108, 111, and 112.

The support 110 carries a plate 118, which is pivotally connected with the support 110 at 119. Another support 120 is situated at a close distance from the support 110, as shown in Figure 5, and is connected with a similar plate 121 by means of a pivot 122. The plate 118 supports a shaft 123, while the plate 121 supports a shaft 124. A pair of rollers 125 and 126 are mounted on the shaft 123, while a similar pair of rollers 127, only one of which is shown in the drawings, are mounted on the shaft 124.

As shown in Figure 5, the plate 118 is provided with several openings 128, while the plate 121 is provided with similar openings 129. A bent arm 130 is carried by the support 110 and is provided with an opening 131, which is of the same size as any one of the openings 128. A similar arm 132 is rigidly connected with the support 120 and is provided with an opening 133 of the same size as any one of the openings 129.

The casing 63 is rigidly connected with a ring 134, which is in contact with and supported by the two rollers 125 and 127. A similar ring 135 is situated at the opposite end of the casing 63 and is supported by another pair of rollers 126 and 127. The right-hand ends of the shafts 123 and 124 (looking in the direction of Figure 1) are carried by two plates 136, only one of which is shown in the drawings. The plates 136 are pivotally mounted at 137 in the supports 138.

An annular member 139, which is rigidly connected with the casing 63 is used for rotating the casing by any suitable means such as a gear transmission 140, which is driven by a motor 141.

The device shown in Figures 1 and 5 provides for the use of casings of various diameters without the necessity of changing the position of the heating element 25. The plates 118 and 121 are maintained in the position shown in Figure 5 through the use of a pair of pins, one of which passes through one of the openings 128 formed in the plate 118 and through the opening 131; the other pin passes through one of the openings 129 formed in the plate 121, and through the opening 133 formed in the arm 132.

If it is desired to use a different casing having a larger diameter, the pins are withdrawn from the openings, the plates 118 and 121 are moved in the direction of the arrows shown in Figure 5 and then one of the pins is again inserted into a different one of the openings 128 and the opening 131. Another pin is inserted in a similar manner through another opening 129 and through the opening 133.

Due to this arrangement, the rollers 125 and 127 may be moved away from each other so that a casing having a larger diameter may be substituted for the casing 63. The largest casing which can be used with the construction illustrated in Figure 5, is shown by broken lines in the drawings.

Figure 2:
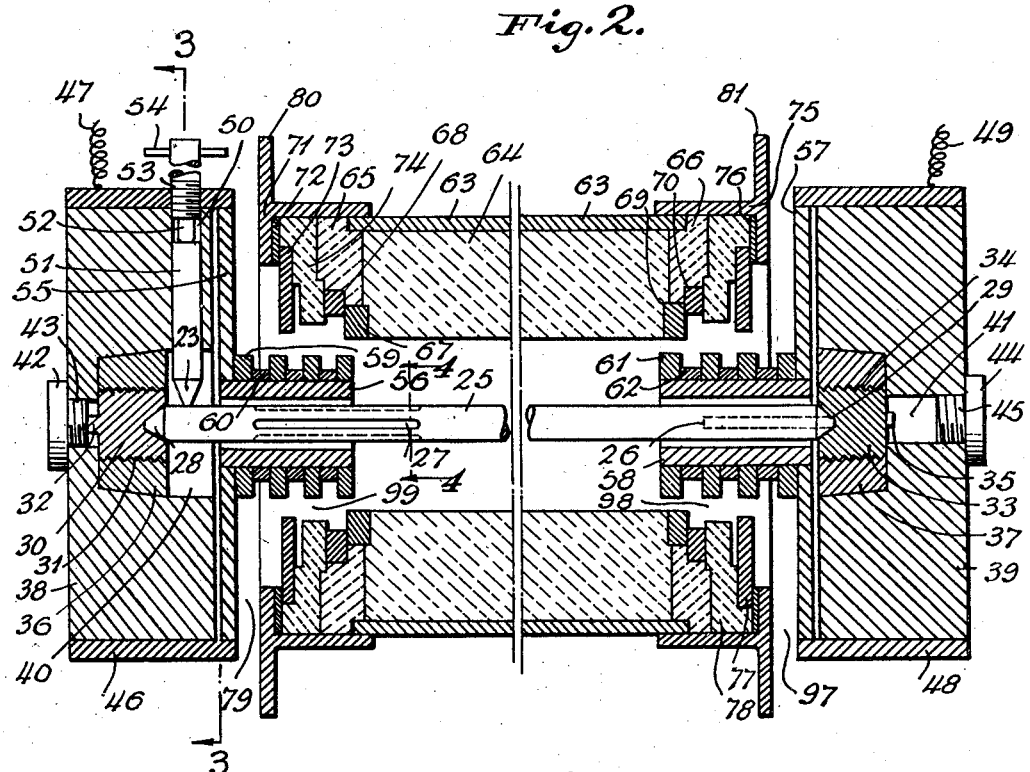
Figure 2 shows a portion of the same furnace in vertical axial-section and on a larger scale.
Figure 3:
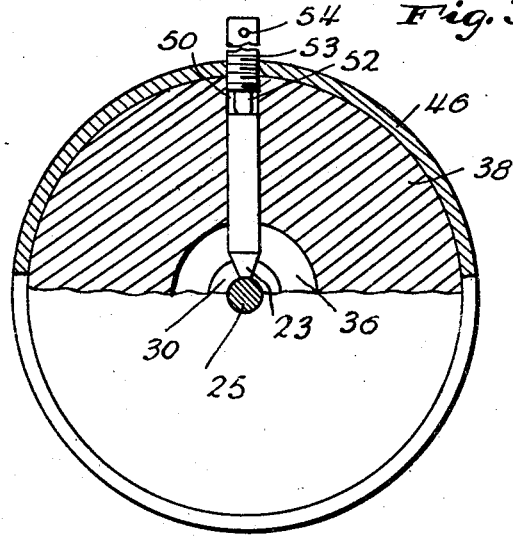
Figure 3 is a section along the line 3—3 of Figure 2.
Figure 4:
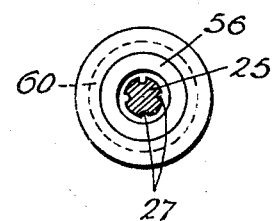
Figure 4 is a section along the line 4—4 of Figure 2.

To operate the furnace, the carriage 106 is first moved to the left (looking in the direction of Figure 1), to permit the insertion of the fusible material 64 into the interior of the casing 63. The motor 141 is then started and rotates by means of the transmission 140 the annular member 139, the casing 63 and the members 64 to 78 carried by the casing 63. When the material to be fused has been inserted into the casing 63 the carriage is moved into the position shown in Figure 1, and the resistance 25 is placed in its proper position between the cylinders 30 and 33 by means of the rod 51 (Figure 2).

The metallic casings 46 and 48 are connected to a source of electrical energy not shown in the drawings, so that an electrical current flows through the casing 46, the plate 38, the conical support 36, the cylinder 30, the resistance 25, the cylinder 33, the conical support 37, the plate 39 and the casing 48.

Figure 10:
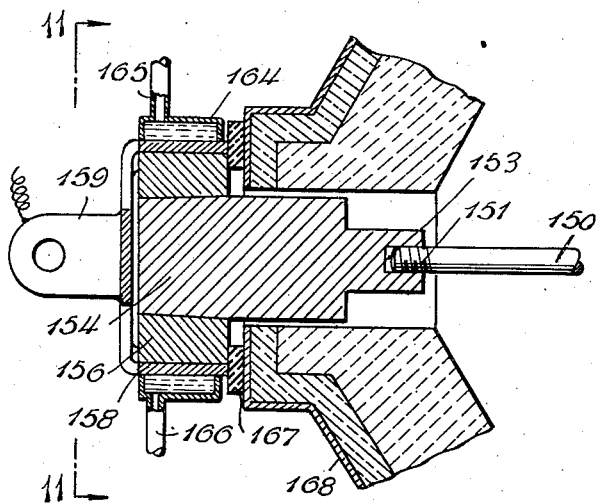
Figure 10 shows on a larger scale and in vertical axial-section a part of the furnace illustrated in Figure 7.
Figure 11:
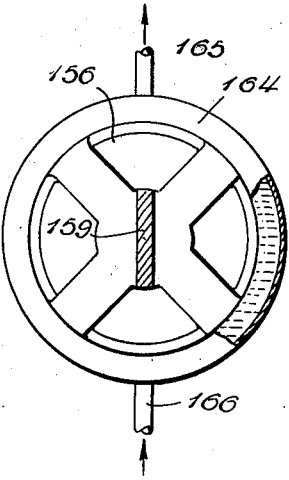
Figure 11 is a section along the line 11—11 of Figure 10.
Figure 12:
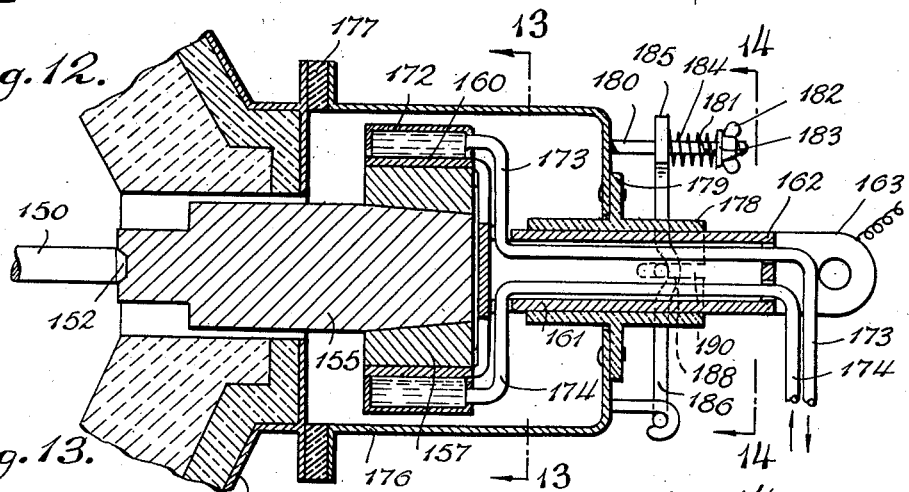
Figure 12 shows another part of the furnace illustrated in Figure 7 on a larger scale and in vertical axial-section.
Figure 13:
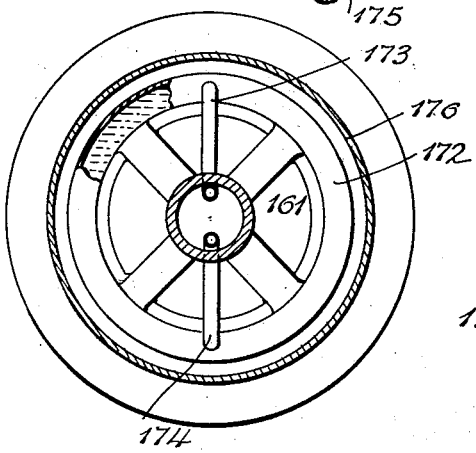
Figure 13 is a section along the line 13—13 of Figure 12.

The furnace illustrated in Figures 7 to 14 of the drawings comprises a heating rod or electrical resistance 150, the end 151 of which is provided with screw threads, as shown in Figure 10. The opposite end 152 of the resistance 150 is conical in shape, as shown in Figure 12.

The end 151 of the resistance 150 is screwed into a threaded bore hole 153 formed in a support 154, which consists of amorphous carbon (Figure 10). The opposite end of the resistance 150 is supported in a cavity formed in a block 155, which is also made of amorphous carbon (Figure 12).

A part of the block 154 is slightly conical in shape and is carried by a sleeve 156. The block 155 is supported by a similar sleeve 157. Both sleeves are conductors of electricity. A metallic casing 158 sourrounds on three sides the block 156 and carries a metallic terminal 159, which may be connected to any suitable source of electrical energy not shown in the drawings.

As shown in Figure 12, a metallic casing 160 surrounds the sleeve 157 and is connected with one of the ends of an elongated tube 161. The tube 161, which is made of a conducting material carries at its opposite end a plate 162, which is firmly connected with another terminal 163.

A water jacket 164 (Figure 10) surrounds the casing 158 and carries two pipes 165 and 166, one of which serves as an inlet for the water. The water circulates between the casing 158 and the walls of the jacket 164 and cools the walls of the casing 158.

A sealing ring 167 made of insulating material is situated between the sleeve 156 and a metallic cover 168.

As shown more clearly in Figure 7 of the drawings, the main container of the furnace consists of a cylindrical body 169, which surrounds a layer 170 consisting of a heat insulating material. A lining 171, which is made of a refractory material surrounds the resistance 150 and is situated between this resistance and the insulating layer 170. The conical end cover 168 is rigidly connected with the cylindrical casing 169 by rivets or other suitable means.

A jacket 172 shown in Figure 12, is carried by the metallic casing 160 and is connected with two pipes 173 and 174, which project into the interior of the tube 161 and which pass through suitable openings formed in the plate 162. The pipes 173 and 174 are used for the circulation of a cooling medium such as water, used for cooling the metallic casing 160.

As shown more clearly in Figure 7, the cylindrical casing 169 is rigidly connected with a metallic end cover 175. A hollow casing 176, which is preferably made of sheet metal surrounds the water jacket 172. A frictional sealing ring 177 (Figures 7 and 12) made of an insulating material is interposed between the casing 176 and the end cover 175. The casing 176 is carried by a support 243 and carries a tubular sleeve or guiding member 178 which is provided with flanges 179, rigidly connected with the casing 176.

Due to this arrangement, the resistance 150 and its ends are movable to a certain extent within the casing 169 in the direction of its longitudinal axis. This axial movement is possible because the tube 161 is movable with respect to the sleeve 178.

The jacket 164 connected with the metallic casing 158 is movable along with the block 154, the resistance 150, the block 155, the sleeve 157, (Figure 12) the casing 160 and the tube 161.

The furnace is provided with resilient means for maintaining the proper contact between the end 152 of the resistance 150 and the block 155. These means comprise a bolt 180, one end of which is rigidly connected with the casing 176. The bolt 180 has screw threads 181 and carries a winged nut 182 as well as a washer 183.

Figure 14:
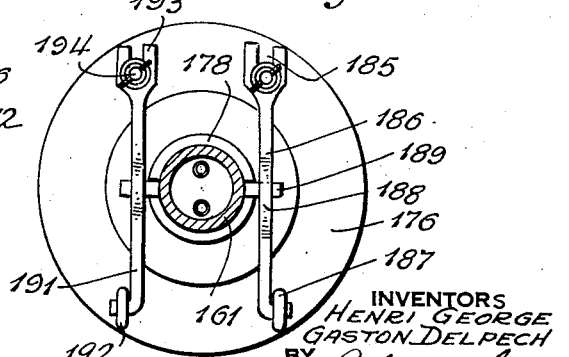
Figure 14 is a section along the line 14—14 of Figure 12.

A coiled spring 184 surrounds the bolt 180 and is in contact at one of its ends with the washer 183. The opposite end of the spring presses against the bifurcated end 185 of a lever 186 (Figure 14). The lever 186 is carried at its lower end by a hook 187, the opposite end of which is rigidly connected with the casing 176. The middle 188 of the lever 186 is somewhat bent and surrounds an insulating rod 189, which is firmly attached to the tube 161 and which passes through a longitudinal slit 190 formed in the sleeve 178.

As shown in Figure 14, a similar lever 191 is situated at the opposite side of the sleeve 178 and is carried by a hook 192, which is rigidly connected with the casing 176. The bifurcated end 193 of the lever 191 surrounds a bolt 194, which is also carried by the casing 176. The bolt 194 is also provided with a coiled spring, which is not shown in the drawings.

Due to the provision of the springs 184, the levers 186 and 191 maintain the tube 161 in the position shown in Figure 12. Since the tube 161 is connected with the end 152 of the heating rod 150 by the casing 160, the sleeve 157 and the block 155, the resistance 150 will be always maintained in close contact with the block 155. Otherwise, slight movements or contractions of the resistance 150 or the block 155 might cause an interruption of the electrical current between the resistance 150 and the block 155.

The cylindrical casing 169 is rigidly connected with two rings 195 and 196, which are in contact with rollers 197, 198 and 199 (Figures 7 and 8). The roller 197 is pivotally mounted in a support 200, while the roller 198 is pivotally mounted in a support 201. The roller 199 is carried by the support 202. The fourth roller and its support are not shown in the drawings. The support 200 is carried by the foundation 203, while the supports 201 and 202 are carried by the foundation 204.

The cylindrical casing 169 is rigidly connected with an annular gear 205, which meshes with a pinion 206 rigidly connected with a gear wheel 207 and rotatably mounted in the support 203. The gear wheel 207 meshes with a gear 208, which is driven by a motor 209 resting upon the support 210. The motor is provided with a switch 211, which may be used for reversing at periodic intervals the direction of rotation of the motor and thus reversing the direction of rotation of the casing 169. The switch 211 is also used for varying the speed of rotation of the motor 209.

As shown in Figures 7 and 9, the jacket 164, which surrounds the casing 158 is carried by a frame 212 by means of members 213 and 214. The frame 212 is slidable in the vertical direction in two guide members 215 and 216, which are rigidly connected with and supported by a carriage 217.

The frame 212 rests upon cams 218 and 219, which are keyed upon an axle 220, rotatably mounted in the guides 215 and 216. A wheel 221 is also keyed upon the shaft 220 and is provided with a handle 222, which is used for rotating the cams 218 and 219. The carriage 216 is mounted on wheels 223 and 224 which are movable along rails 225 and 226.

The cams 218 and 219 are operated and the carriage 217 is moved along the rails 225 and 226, when it is necessary to take the heating element 150 out of the furnace.

In operation, the terminals 159 and 163 are connected to a source of electrical energy, which is not shown in the drawings. Then a current will flow through the terminal 159, the block 154, the resistance 150, the block 155, the tube 161 and the terminal 163.

When the motor 209 is started, it will revolve the casing 169 through the medium of the gear wheels 208, 207, 206, and 205. The switch 211 is used to change the speed of rotation of the casing 169 and to reverse the direction of its rotation.

Figure 15:
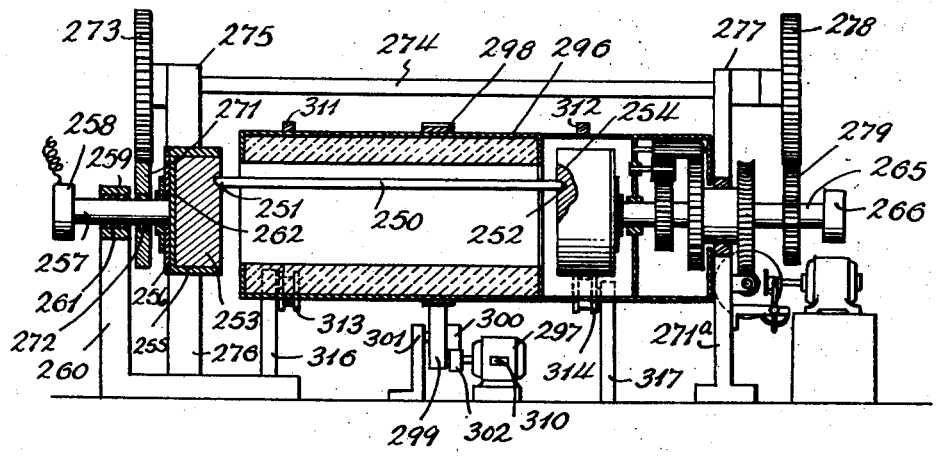
Figure 15 shows partly in vertical section and partly in side elevation a furnace used for the manufacture of large hollow articles.
Figure 16:
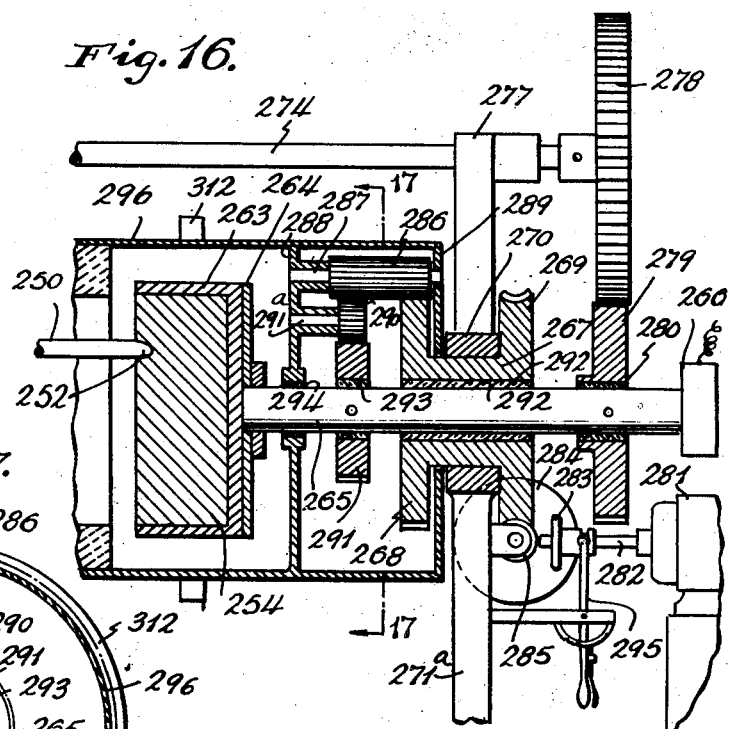
Figure 16 shows on a larger scale and in vertical cross-section a part of the furnace illustrated in Figure 15.
Figure 17:
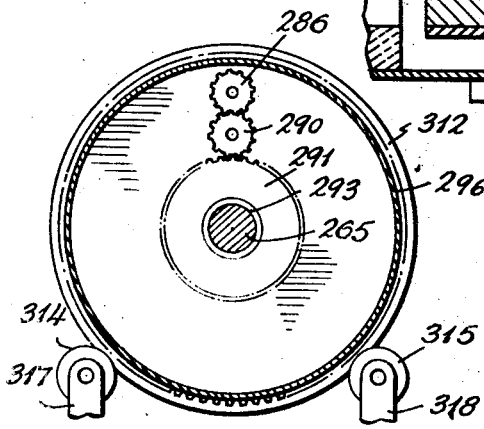
Figure 17 is a section along the line 17—17 of Figure 16.

The furnace illustrated in Figures 15, 16, and 17 of the drawings is used for manufacturing articles having a comparatively large diameter and/or having walls of different thicknesses. The furnace comprises an electrical resistance or heating element 250, which is made of graphite and which is arranged parallel to the longitudinal axis of the furnace. The resistance 250 has two conical ends 251 and 252. The end 251 is situated within a cavity formed in a cylindrical plate or support 253, which is made of amorphous carbon. The opposite end 252 of the resistance 250 is carried by a plate 254, which also consists of amorphous carbon. The support 253 is surrounded by and connected with a casing 255, which is rigidly connected with a plate 256, as shown in Figure 15.

The plate 256 surrounds and is rigidly connected with one end of a shaft 257, which carries at its opposite end a terminal 258 adapted to be connected to a source of electrical energy not shown in the drawings. The shaft 257 is rotatably mounted in a bearing 259, which is electrically insulated from its support 260 by a layer of insulation 261. A flange 262 is connected with the plate 256 and surrounds a portion of the shaft 257.

As shown more clearly in Figure 16 of the drawings, the plate 254 is surrounded on three sides by a casing 263, which is rigidly connected with a plate 264. The plate 264 is rigidly connected with one end of a shaft 265, the opposite end of which carries a terminal 266, which may be connected to the source of electrical energy.

The shaft 265 is surrounded by a sleeve 267, which is cast of a single piece with a pair of gear wheels 268 and 269. The sleeve 267 is carried by a bearing 270, which forms a part of a support 271a.

A gear wheel 271 shown in Figure 15 is mounted on the shaft 257 and is rotated along with this shaft. However, the gear wheel 271 is electrically insulated from the shaft 257 through the provision of the insulation 272, which is interposed between the gear wheel 271 and the shaft 257.

The gear wheel 271 meshes with a gear wheel 273, which is keyed on a shaft 274 extending practically along the entire length of the furnace. The shaft 274 is supported by a bearing 275 forming a part of the support 276 and is also supported by a bearing 277, which forms a part of the support 277a.

The shaft 274 also carries a gear wheel 278, which is keyed to the shaft 274 and which meshes with a gear wheel 279, keyed to the shaft 265. However, the gear wheel 279 is electrically insulated from the shaft 265 through the provision of the insulation 280.

Due to the fact that the shaft 274 rotates at the same speed as the wheels 273 and 278, the two shafts 257 and 265 are rotated in synchronism with each other. The purpose of the shaft 274 and of the gear mechanism connected with this shaft is to provide for a synchronous rotation of the two shafts 257 and 265.

A motor 281, shown in Figure 16, is used for driving the shafts 265 and 257. The shaft 282 of the motor 281 rotates a roller or wheel 283, which in its turn drives the disc or wheel 284. The wheel 284 is rigidly connected with a worm 285. The gear wheel 269 meshes with the worm 285 and is driven by it. Since the sleeve 267 is cast of the same piece as the gear wheels 268 and 269, the gear 268 will be rotated along with the sleeve 267 when the gear 269 is rotated by the worm 285.

The gear wheel 268 meshes with the pinion 286, which is carried by a shaft 287 supported by the walls 288 and 289 (Figure 16). The pinion 286 meshes with a gear 290 carried by a shaft 291a, which is rotatably mounted in the wall 288. The gear wheel 290 drives the toothed wheel 291, which is keyed to the shaft 265.

In order to prevent the leakage of the electrical current, a part of the sleeve 267 and of the gear wheels 269 and 268 consists of the electrical insulation 292. At least a part of the wheel 291 also consists of the insulation 293. The wall 288, which is used as a support for the gear wheels 286 and 290, is also provided with insulation 294 surrounding the shaft 265.

As has been mentioned already, the motor 281 drives the shaft 282, which rotates the wheel 283. A suitable device 295 is used for shifting the position of the wheel 283 with respect to the wheel 284 to change the speed of rotation of the latter or to disconnect the wheel 283 from the wheel 284. The wheel 284 drives the worm 285, which in its turn rotates the gear wheels 269 and 268. The gear wheel 268 drives the pinion 286, which transmits its rotation to the gear 290. The gear 290 drives the gear 291, which is keyed to the shaft 265. Due to this arrangement, the shaft 265 is driven by the motor 281.

The shaft 265 drives by means of the gears 279 and 278 the shaft 274, which rotates the gears 273 and 271 and thus drives the shaft 257. The shafts 265 and 257 rotate in synchronism with each other and drive the blocks 254 and 253, which carry the electrical heating resistance 250, so that the electrical resistance 250 is rotated within the casing 296.

The walls 288 and 289 are rigidly connected with and surrounded by the main cylindrical casing or container 296. The casing 296 may be driven independently of the resistance 250 by a separate motor 297, provided with a switch 310 for varying the speed of the motor (Fig 15). The casing 296 is rigidly connected with a toothed ring 298, which meshes with a gear wheel 299 rigidly connected with a gear wheel 300 and rotatably mounted in a support 301. The casing 296 is also rigidly connected with rings 311 and 312 which are supported by rollers 313, 314 and 315 mounted in supports 316, 317 and 318. (Figs. 15 and 17.)

The gear wheel 300 meshes with a gear wheel 302, which is rigidly connected with the shaft of the motor 297.

The rotation of the motor 297 is transmitted through the gear wheels 302, 300, and 299 to the toothed ring 298 and to the cylindrical casing 296. Since the walls 288 and 289 are rigidly connected with the casing 296, these walls together with the pinions 286 and 290 will rotate along with the casing 296. The relative movement of the pinion 290 with respect to the gear wheel 291 will not interfere with the rotation of the latter, which is caused by the motor 281. However, only one of the motors 281 and 297 may be operated at one time, since it is not necessary to use both motors simultaneously.

When both the motor 281 and the motor 297 are used, the casing 296 will be rotated with a velocity which is independent of the velocity of rotation of the resistance 250 within the casing 296.

The furnace illustrated in Figures 18 to 22 of the drawings is heated by a three-phase electrical current. The heating element designated generally by the numeral 325 consists of three interconnected rods 326, 327, and 328, which are adapted to be placed above the fusible material 329. The graphite rods 326 and 327 are parallel to each other and may be placed horizontally above the fusible material 329. As shown in Figure 22, the forward ends 330 and 331 of the rods 326 and 327, respectively, are rounded and have a smaller cross-section than the main body of these rods.

The adjacent end 332 of the carbon rod 328 is provided with screw threads. The rod 328 is inclined with respect to the rods 326 and 327, as shown in Figures 18 and 19 and it is placed in such a way that its threaded end 332 is situated close to the ends 330 and 331 of the other carbon rods (Fig. 22).

The forward end of the heating element, which is its neutral point, is formed by a graphite plate 333, shown in Figures 18 and 22. The plate 333 is provided with cavities in which lie the ends 330 and 331 of the rods 326 and 327 and is also provided with a cylindrical threaded portion 334, into which is screwed the threaded end 332 of the rod 328.

As shown more clearly in Figure 20, the rods 326, 327, and 328 are supported by three carbon blocks 335, 336, and 337. The block 336 has a hollow cylindrical portion which is provided with inner screw threads 338 and carries a sleeve 339 having a cavity, in which lies the rounded end 340 of the rod 326 (Fig. 21).

The block 335 is provided with a hollow cylindrical portion having inner screw threads 341, and a sleeve 342 is screwed into the block 337. The threaded end 343 of the inclined rod 328 is screwed into the sleeve 342, as shown in Figure 21. The adjacent end of the rod 327 which is parallel to the rod 326, is carried by a sleeve which is not shown in the drawings and which is similar to the sleeve 339.

The block 336 is insulated from the block 337 by means of an insulating wall 344 (Fig. 20). A similar insulating wall 345 separates the block 337 from the block 335, while the block 335 is insulated from the block 336 by the insulating wall 346.

The insulating wall 344 has a portion 347, which projects beyond the blocks 336 and 337 and which separates a metallic conductor 348 from a metallic conductor 349. A projecting portion 350 of the insulating wall 346 and a similar projecting portion 351 of the insulating wall 345 are situated at both ends of the metallic conductor 352. The metallic conductors 348, 349, and 352 may be connected with the three phases of a generator or a main, which is not shown in the drawings and which supplies a three-phase electrical current.

The insulating members 347, 350, and 351 along with the metallic conductors 348, 349, and 352 are surrounded by a sleeve 353, which is made of an insulating material. The insulating sleeve 353 is surrounded in its turn by a metallic casing 354.

The casing 354 is made of one piece with the flange 385, which is provided with a graphited packing ring 355. The casing 354 also carries a pair of pivots 356, only one of which is shown in the drawings. The pivots 356 are carried by a pair of supports 357 and 358, which are interconnected by a platform 359. The platform 359 and the two supports 357 and 358 form a carriage, which is mounted on wheels 360 and 361 and is movable along the rails 362.

The main container 363 of the furnace is rigidly connected with two covers 364 and 365, as shown in Figure 18. The covers 364 and 365 and the container or casing 363 surround a heat insulating lining 366 and a ceramic layer 367. The central opening 368 formed in the cover 365 serves for the insertion of the heating element 325.

In the position shown in Figures 18 and 21, the packing 355 of the flange 385 is in contact with the rotating cover 365 and thus prevents the escape of gases through the opening 368.

The central charging opening formed in the cover 364 at the opposite end of the furnace is closed by a member 369, which is provided with a handle 370. The member 369 is movable along the guides 371.

A pair of rings 372 and 373 are rigidly connected with the container 363 and are supported by the rollers 374 and 375, which are rotatably mounted in the supports 376 and 377. The foundation 378 serves as a carrier for the supports 376 and 377. An annular gear 379 is rigidly connected with the casing 363 and meshes with a gear wheel 380 mounted in the support 381. A motor 383 is used for driving the gear wheel 382 which meshes with the gear wheel 380.

As shown in Figure 19, the heating element 325 may be raised vertically when it is not in use and may be protected by a covering 384, which is shown in cross-section in Figure 19.

In operation, the metallic terminals 348, 349 and 352 are jointed to a generator of a three-phase current so that this current will flow through the blocks 335, 336, and 337, and through the sleeves 339, 342 and the third sleeve, which is not shown in the drawings. The current passing through these sleeves will flow through three rods 326, 327, and 328 to the neutral point formed by the plate 333.

What is claimed is:

1. In combination, a cylindrical container, means situated outside of said container for supporting the same, a heating rod at least partly within said container, a pair of large plates situated outside of said container and close to two ends thereof, means connected with one of said large plates for supporting one end of said heating rod, means connected with the other large plate for supporting the other end of said heating rod, a space being formed within said container between said heating rod and the walls thereof, means connected with said large plates for supplying an electrical current to said heating rod, means for producing a flow of gas within said container, means connecting the fourth-mentioned means with the fifth-mentioned means, rings situated in the path of said flow of gas at two ends of said container and surrounding said heating rod, and means connected with the fourth-mentioned means and carrying said rings.

2. In combination, a container, means connected with the exterior surfaces of said container for supporting the same, a heating rod at least partly within said container, a free space being provided within said container around said heating rod, two large plates situated outside of said container and at the two ends thereof, means connected with said large plates for supporting two ends of said heating rod, means connected with said large plates for transmitting an electrical current to said heating rod, means connected with the third-mentioned means for providing a flow of gas within said container, at least one ring situated in the path of said flow of gas, a sleeve carrying said ring and surrounding a portion of said heating rod, and means connecting said sleeve with the third-mentioned means.

3. In combination, a container, means for supporting said container, a heating rod, means supporting said heating rod at least partly within said container, a free space being formed within said container around said heating rod, and means situated on opposite sides of said container and adapted to create a uniform alternating flow of gas through said container in two opposite directions.

4. In combination, a container, a heating rod, means supporting said heating rod at least partly within said container, means connected with the first-mentioned means for supplying an electrical current to said heating rod, rollers situated outside of said container and supporting the same, shafts upon which said rollers are mounted, and pivoting members carrying said shafts and adapted to adjust the level of said rollers and their relative distances.

5. In combination, a rotatable cylindrical container, a heating rod, at least a part of which is situated within said container, two large plates situated outside of said container at the two ends thereof, means connected with said large plates and supporting the two ends of said heating rod, means connected with said large plates for supplying an electrical current to said heating rod, means connected with the second-mentioned means for moving one of said large plates with respect to said container, a fan, means connecting said fan with the second-mentioned means, and a movable rod supported by the second-mentioned means and adapted to come in contact with said heating rod to clamp the same.

6. In combination, a container, a heating rod, at least a part of said heating rod consisting of a carbonaceous material being situated within said container, a member made of graphite and freely supporting one end of said heating rod, a plate made of amorphous carbon and situated close to said container, means connecting said plate with said graphite member, a casing surrounding said plate, a sleeve surrounding a portion of said heating rod adjacent to said end thereof, means connecting said sleeve with said casing, and means adapted to be connected to a source of electrical energy and supporting the opposite end of said heating rod.

7. In combination, a cylindrical container, means situated outside of said container for supporting the same, a heating rod at least partly within said container, a pair of plates situated outside of said container and close to the two ends thereof, means connected with one of said plates for supporting one end of said heating rod, means connected with the other plate for supporting the other end of said heating rod, a space being formed within said container between said heating rod and the walls thereof, means connected with said plates for supplying an electrical current to said heating rod, means for producing a flow of gas within said container, means connecting the fourth-mentioned means with the fifth-mentioned means, rings situated at two ends of said container and surrounding said heating rod, means connected with the fourth-mentioned means and carrying said rings, other rings having a larger diameter than the first-mentioned rings and situated within said container at two said ends thereof, and means connecting the last-mentioned rings with said container, said gas flowing between the first-mentioned rings and the second-mentioned rings.

8. In combination, a container, means connected with the exterior surface of said container for supporting the same, a heating rod at least partly within said container, a free space being provided within said container around said heating rod, two large plates situated outside of said container and at the two ends thereof, means connected with said large plates for supporting two ends of said heating rod, means connected with said large plates for transmitting an electrical current to said heating rod, means connected with the third-mentioned means for providing a flow of gas within said container, a ring, a sleeve carrying said ring and surrounding a portion of said heating rod, means connecting said sleeve with the third-mentioned means, another ring having an inner diameter which is larger than the outer diameter of said ring, and means connected with said container and the second-mentioned ring and supporting the second-mentioned ring within said container, said gas flowing between the first-mentioned ring and the second-mentioned ring.

9. In combination, a rotatable cylindrical container, a heating rod, at least a part of which is situated within said container, two large plates situated outside of said container at the two ends thereof, means connected with said large plates and supporting the two ends of said heating rod, means connected with said large plates for supplying an electrical current to said heating rod, means connected with the second-mentioned means for moving one of said large plates relatively to said container, and a rod adapted to contact said heating rod to clamp the same and to interrupt said contact while an electrical current is supplied to said rod, the second-mentioned means comprising means for movably supporting the last-mentioned rod.

HENRI GEORGE.
GASTON DELPECH.